US012120056B2

(12) United States Patent
Lopez et al.

(10) Patent No.: US 12,120,056 B2
(45) Date of Patent: Oct. 15, 2024

(54) CHANNEL SOUNDING FOR DISTRIBUTED TRANSMISSION

(71) Applicant: Telefonaktiebolaget LM Ericsson (publ), Stockholm (SE)

(72) Inventors: Miguel Lopez, Solna (SE); Leif Wilhelmsson, Lund (SE); Dennis Sundman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 17/608,508

(22) PCT Filed: May 9, 2019

(86) PCT No.: PCT/EP2019/061923
§ 371 (c)(1),
(2) Date: Nov. 3, 2021

(87) PCT Pub. No.: WO2020/224784
PCT Pub. Date: Nov. 12, 2020

(65) Prior Publication Data
US 2022/0239439 A1    Jul. 28, 2022

(51) Int. Cl.
*H04L 5/00* (2006.01)
*H04L 27/26* (2006.01)
(Continued)

(52) U.S. Cl.
CPC .......... *H04L 5/0051* (2013.01); *H04L 5/0035* (2013.01); *H04L 27/2657* (2013.01); *H04W 72/0453* (2013.01); *H04B 7/0452* (2013.01)

(58) Field of Classification Search
CPC . H04L 5/0051; H04L 5/0035; H04L 27/2657; H04W 72/0453; H04B 7/0452
(Continued)

(56) References Cited

U.S. PATENT DOCUMENTS 6,937,592 B1 * 8/2005 Heath, Jr. ............. H04W 48/18
370/337
9,325,855 B2    4/2016 Liu et al.
(Continued)

FOREIGN PATENT DOCUMENTS

CN    104767699 A    7/2015
CN    107534472 A    1/2018
(Continued)

OTHER PUBLICATIONS

Porat, R., et al., "Constrained Distributed MU-MIMO", IEEE 802.11-14/1439r0, Sep. 4, 2018, pp. 1-9.
(Continued)

*Primary Examiner* — Mong-Thuy T Tran
(74) *Attorney, Agent, or Firm* — Coats & Bennett, PLLC

(57) ABSTRACT

A method for a primary wireless transmitter is disclosed. The primary wireless transmitter is configured to participate in transmission to a wireless receiver using spatial multiplexing in coordination with one or more secondary wireless transmitters. The method comprises assigning—from a collection of available channel sounding resources—respective channel sounding resources to the primary wireless transmitter and to the one or more secondary wireless transmitters, wherein each available channel sounding resource is assigned to at most one of the wireless transmitters. Each assigned respective channel sounding resource is for transmission of a respective non-spatial-multiplexed first channel sounding signal, and the first channel sounding signals are for phase tracking of signals transmitted by the primary wireless transmitter and/or for phase tracking of signals transmitted by the one or more secondary wireless transmitters. The method also comprises transmitting, to the one or more secondary wireless transmitters, information indicative of the respective channel sounding resources assigned to the one or more secondary wireless transmitters. Methods
(Continued)

for the secondary wireless transmitters and the wireless receiver are also disclosed, as well as corresponding apparatuses, transmitter, receiver, access point, user station, control node, and computer program product.

26 Claims, 3 Drawing Sheets

(51) Int. Cl.
*H04W 72/0453* (2023.01)
*H04B 7/0452* (2017.01)

(58) Field of Classification Search
USPC .......................................................... 370/329
See application file for complete search history.

(56) References Cited

U.S. PATENT DOCUMENTS

| | | | |
|---|---|---|---|
| 9,935,750 B2 | 4/2018 | Shi et al. | |
| 10,826,588 B2 | 11/2020 | Chun et al. | |
| 2008/0285669 A1* | 11/2008 | Walton | H04L 27/2647 |
| | | | 375/260 |
| 2012/0275356 A1* | 11/2012 | Aharony | H04B 7/0689 |
| | | | 370/310 |
| 2013/0089123 A1 | 4/2013 | Rahul et al. | |
| 2013/0286962 A1* | 10/2013 | Heath, Jr. | H04W 16/14 |
| | | | 370/329 |
| 2017/0111201 A1 | 4/2017 | Sandell et al. | |
| 2018/0205528 A1* | 7/2018 | Bai | H04L 5/0092 |
| 2018/0234135 A1* | 8/2018 | Vermani | H04W 72/29 |
| 2019/0028168 A1* | 1/2019 | Vermani | H04B 7/024 |
| 2019/0045366 A1* | 2/2019 | Vermani | H04W 16/06 |
| 2023/0029758 A1* | 2/2023 | Liu | H04W 52/46 |
| 2023/0055895 A1 | 2/2023 | Sun et al. | |

FOREIGN PATENT DOCUMENTS

| | | |
|---|---|---|
| CO | 2023013496 A2 | 11/2023 |
| GB | 2500382 A | 9/2013 |
| WO | 2014094359 A1 | 6/2014 |
| WO | 2017215737 A1 | 12/2017 |
| WO | 2019028265 A1 | 2/2019 |
| WO | 2022215004 A1 | 10/2022 |

OTHER PUBLICATIONS

IEEE Computer Society, "Part 11: Wireless LAN Medium Access Control (MAC) and Physical Layer (PHY) Specifications", IEEE Standards Association, IEEE Std 802.11-2016, Dec. 7, 2016, pp. 1-3534, New York, NY.

Yang et al., "11ax OFDMA Tone Plan Leftover Tones and Pilot Structure", Date: Jul. 13, 2015, doc.: IEEE 802.11-15/0819r0, Slides 1-32.

Yu, R. "Spec Text Changes Regarding Single Stream Pilot." Date: Sep. 4, 2018, pp. 1-4, doc.: IEEE 802.11-18/1442r0.

Park et al., "Multi-AP Transmission Procedure", Date Mar. 11, 2019, Slides 1-18, doc.: IEEE 802.11-19/0448r1.

Oteri, K. et al., "Clarifying Link Level Simulator Assumptions", Interdigital, doc.: IEEE 802.11-15/1056r1, Sep. 13, 2015, pp. 1-16, IEEE.

* cited by examiner

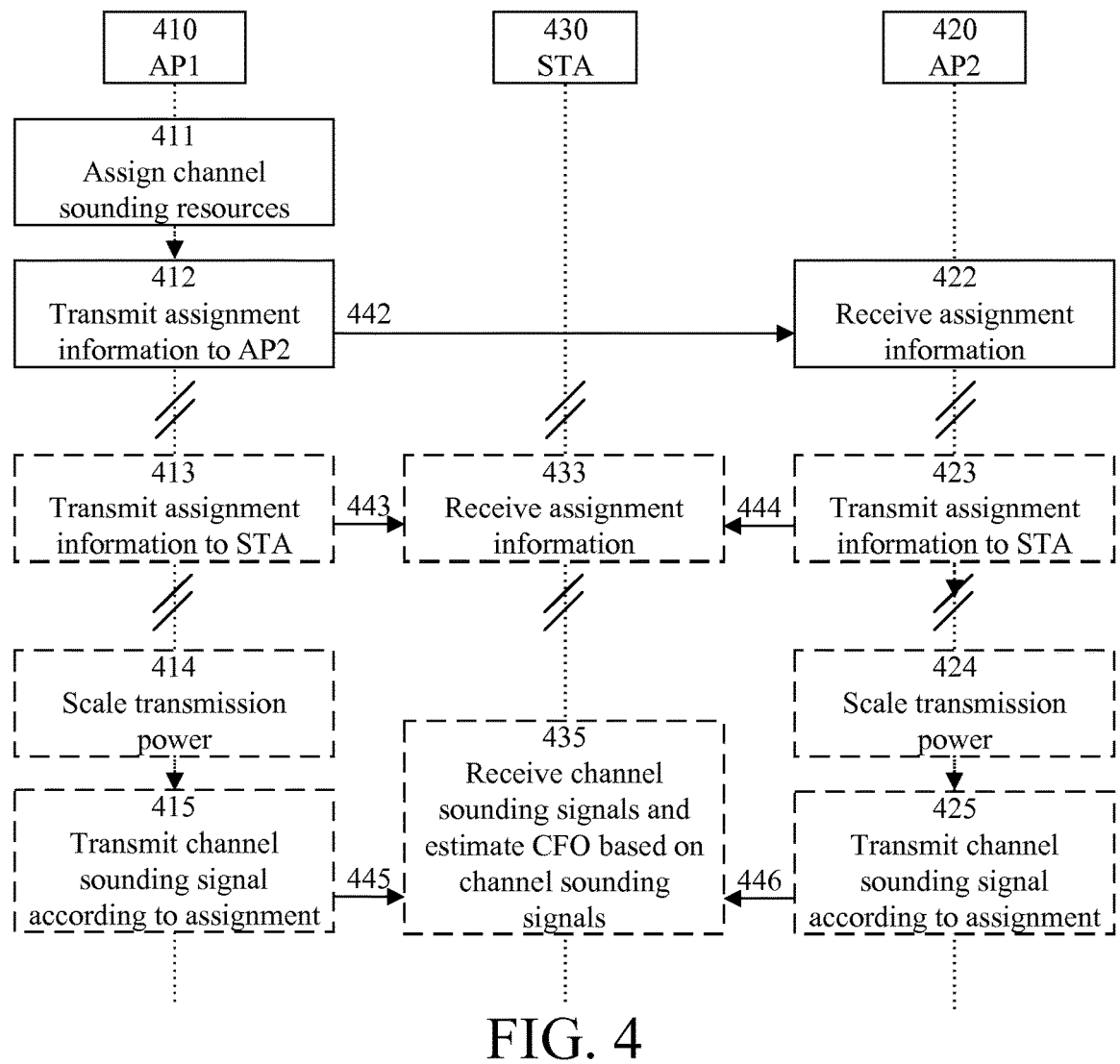
FIG. 4
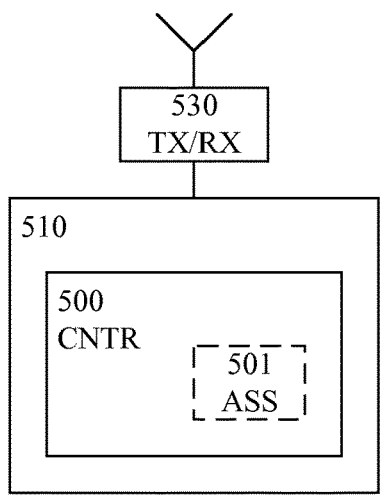
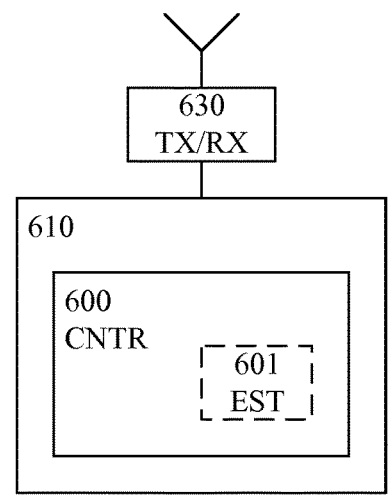
FIG. 5  FIG. 6

CHANNEL SOUNDING FOR DISTRIBUTED TRANSMISSION

TECHNICAL FIELD

The present disclosure relates generally to the field of wireless communication. More particularly, it relates to distributed (multi-point) transmission.

BACKGROUND

Distributed (or multi-point) coordinated transmission from two or more wireless transmitters is well known. One example is the coordinated multi-point (CoMP) concept as specified by Third Generation Partnership Project (3GPP) standards. Another example is the proposition to use distributed downlink multiple-input multiple-output (D-DL-MIMO)—where two or more access points (APs; an example of wireless transmitters) transmit several space-time streams simultaneously to the same receiving station (STA; an example of a wireless receiver)—for the Extremely High Throughput (EHT) concept proposed as an enhancement of the IEEE 802.11 standard. Some further details of the latter are given in "Constrained Distributed MU-MIMO", by Ron Porat and Srinath Puducheri, Broadcom, doc.: IEEE 802.11-18/1439r0, September 2018.

When the two or more wireless transmitters are sufficiently coordinated, the distributedly transmitted signals are constructively combined at reception by a wireless receiver. This is often achievable when the two or more wireless transmitters have access to a mutual communication channel which is relatively static and interference free; e.g., a wired connection.

However, when the two or more wireless transmitters are not sufficiently coordinated, the distributedly transmitted signals are typically not fully constructively combined at reception by the wireless receiver. Insufficient coordination may occur, for example, when the two or more wireless transmitters only have access to a mutual communication channel which is not relatively static and interference free; e.g., a wireless connection such as over an air interface.

One way of handling insufficient coordination between two or more wireless transmitters is to apply phase tracking, wherein a carrier frequency offset is estimated and compensated for at the wireless receiver.

Therefore, there is a need for approaches for enabling estimation of the carrier frequency offset in a distributed (or multi-point) coordinated transmission scenario. Preferably, the approaches should be suitable for handling of imperfections in the coordination of the two or more wireless transmitters configured for distributed coordinated transmission.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a primary wireless transmitter configured to participate in transmission to a wireless receiver using spatial multiplexing in coordination with one or more secondary wireless transmitters.

The method comprises assigning—from a collection of available channel sounding resources—respective channel sounding resources to the primary wireless transmitter and to the one or more secondary wireless transmitters, wherein each available channel sounding resource is assigned to at most one of the wireless transmitters, wherein each assigned respective channel sounding resource is for transmission of a respective non-spatial-multiplexed first channel sounding signal, and wherein the first channel sounding signals are for phase tracking of signals transmitted by the primary wireless transmitter and/or for phase tracking of signals transmitted by the one or more secondary wireless transmitters.

The method also comprises transmitting, to the one or more secondary wireless transmitters, information indicative of the respective channel sounding resources assigned to the one or more secondary wireless transmitters.

In some embodiments, the information indicative of respective channel sounding resources assigned to the one or more secondary wireless transmitters is transmitted to the one or more secondary wireless transmitters together with: user data to be transmitted to the wireless receiver by the one or more secondary wireless transmitters, and/or control signaling for triggering coordinated operation of the one or more secondary wireless transmitters.

In some embodiments, the method further comprises transmitting, to the wireless receiver, the information indicative of respective channel sounding resources assigned to the one or more secondary wireless transmitters.

In some embodiments, the information indicative of respective channel sounding resources assigned to the one or more secondary wireless transmitters is transmitted to the wireless receiver together with a channel sounding announcement signal.

In some embodiments, the first channel sounding signal is for phase tracking of at least signals transmitted by the primary wireless transmitter.

In some embodiments, the method further comprises transmitting the non-spatial-multiplexed first channel sounding signal in each respective channel sounding resource assigned to the primary wireless transmitter.

In some embodiments, the method further comprises muting available channel sounding resources not assigned to the primary wireless transmitter.

In some embodiments, the method further comprises scaling transmission power for the respective channel sounding resources assigned to the primary wireless transmitter, wherein the scaling factor is larger than one and less than, or equal to, a ratio between a total amount of available channel sounding resources of the collection and an amount of respective channel sounding resources assigned to the primary wireless transmitter.

In some embodiments, the method further comprises, simultaneously to transmitting the non-spatial-multiplexed first channel sounding signal in each respective channel sounding resource assigned to the primary wireless transmitter, also transmitting a spatial-multiplexed second channel sounding signal in each respective channel sounding resource assigned to the primary wireless transmitter.

In some embodiments, the method further comprises transmitting the spatial-multiplexed second channel sounding signal also in each respective channel sounding resource assigned to any of the secondary wireless transmitters.

In some embodiments, the second channel sounding signal is for channel estimation in relation to the primary wireless transmitter.

In some embodiments, the collection of available channel resources comprises time and/or frequency resources of a single channel sounding opportunity.

A second aspect is a method for a secondary wireless transmitter configured to participate in transmission to a wireless receiver using spatial multiplexing in coordination with at least a primary wireless transmitter.

The method comprises receiving, from the primary wireless transmitter, information indicative of respective channel sounding resources—from a collection of available channel sounding resources—assigned to the secondary wireless transmitter, wherein each channel sounding resource assigned to the secondary wireless transmitter is assigned only to the secondary wireless transmitter, wherein each assigned respective channel sounding resource is for transmission of a respective non-spatial-multiplexed first channel sounding signal, and wherein the first channel sounding signals are for phase tracking of signals transmitted by the primary wireless transmitter and/or for phase tracking of signals transmitted by the secondary wireless transmitter.

In some embodiments, the information indicative of respective channel sounding resources assigned to the secondary wireless transmitter is received together with: user data to be transmitted to the wireless receiver by the secondary wireless transmitters, and/or control signaling for triggering coordinated operation of the secondary wireless transmitter.

In some embodiments, the method further comprises transmitting, to the wireless receiver, the information indicative of respective channel sounding resources assigned to the secondary wireless transmitter.

In some embodiments, the information indicative of respective channel sounding resources assigned to the secondary wireless transmitter is transmitted to the wireless receiver together with a channel sounding announcement signal.

In some embodiments, the first channel sounding signal is for phase tracking of at least signals transmitted by the secondary wireless transmitter.

In some embodiments, the method further comprises transmitting the non-spatial-multiplexed first channel sounding signal in each respective channel sounding resource assigned to the secondary wireless transmitter.

In some embodiments, the method further comprises muting available channel sounding resources not assigned to the secondary wireless transmitter.

In some embodiments, the method further comprises scaling transmission power for the respective channel sounding resources assigned to the secondary wireless transmitter, wherein the scaling factor is larger than one and less than, or equal to, a ratio between a total amount of available channel sounding resources of the collection and an amount of respective channel sounding resources assigned to the secondary wireless transmitter.

In some embodiments, the method further comprises, simultaneously to transmitting the non-spatial-multiplexed first channel sounding signal in each respective channel sounding resource assigned to the secondary wireless transmitter, also transmitting a spatial-multiplexed second channel sounding signal in each respective channel sounding resource assigned to the secondary wireless transmitter.

In some embodiments, the method further comprises transmitting the spatial-multiplexed second channel sounding signal also in each respective channel sounding resource assigned to the primary wireless transmitter.

In some embodiments, the second channel sounding signal is for channel estimation in relation to the secondary wireless transmitter.

In some embodiments, the collection of available channel resources comprises time and/or frequency resources of a single channel sounding opportunity.

A third aspect is a method for a wireless receiver configured to receive spatial multiplexing transmissions from a primary wireless transmitter in coordination with one or more secondary wireless transmitters.

The method comprises receiving, from one or more of the primary and secondary wireless transmitters, information indicative of respective channel sounding resources—from a collection of available channel sounding resources—assigned to the primary and secondary wireless transmitters, wherein each available channel sounding resource is assigned to at most one of the wireless transmitters, wherein each assigned respective channel sounding resource is for transmission of a respective non-spatial-multiplexed first channel sounding signal, and wherein the first channel sounding signals are for phase tracking of signals transmitted by the primary wireless transmitter and/or for phase tracking of signals transmitted by the one or more secondary wireless transmitters.

In some embodiments, the information indicative of respective channel sounding resources assigned to the primary and secondary wireless transmitters is received together with a channel sounding announcement signal.

In some embodiments, the first channel sounding signals are for phase tracking of signals transmitted by the primary wireless transmitter and for phase tracking of signals transmitted by the one or more secondary wireless transmitters.

In some embodiments, the method further comprises receiving a non-spatial-multiplexed first channel sounding signal in each indicated respective channel sounding resource, and estimating a carrier frequency offset for the primary and secondary wireless transmitters based on the received first channel sounding signals.

In some embodiments, estimating a carrier frequency offset for the primary and secondary wireless transmitters comprises estimating an average carrier frequency offset for the primary and secondary wireless transmitters based on the received first channel sounding signals.

In some embodiments, estimating a carrier frequency offset for the primary and secondary wireless transmitters comprises estimating a respective carrier frequency offset for each of the wireless transmitters based on corresponding ones of the received first channel sounding signals.

In some embodiments, the method further comprises, simultaneously to receiving the non-spatial-multiplexed first channel sounding signal in each indicated respective channel sounding resource, also receiving a spatial-multiplexed second channel sounding signal in each indicated respective channel sounding resource.

In some embodiments, the method further comprises estimating channels in relation to the primary and secondary wireless transmitters based on the second channel sounding signals.

In some embodiments, the collection of available channel resources comprises time and/or frequency resources of a single channel sounding opportunity.

A fourth aspect is a computer program product comprising a non-transitory computer readable medium, having thereon a computer program comprising program instructions. The computer program is loadable into a data processing unit and configured to cause execution of the method according to any of the first, second, or third aspects when the computer program is run by the data processing unit.

A fifth aspect is an apparatus for a primary wireless transmitter configured to participate in transmission to a wireless receiver using spatial multiplexing in coordination with one or more secondary wireless transmitters.

The apparatus comprises controlling circuitry configured to cause assignment—from a collection of available channel sounding resources—of respective channel sounding resources to the primary wireless transmitter and to the one or more secondary wireless transmitters, wherein each available channel sounding resource is assigned to at most one of the wireless transmitters, wherein each assigned respective channel sounding resource is for transmission of a respective non-spatial-multiplexed first channel sounding signal, and wherein the first channel sounding signals are for phase tracking of signals transmitted by the primary wireless transmitter and/or for phase tracking of signals transmitted by the one or more secondary wireless transmitters.

The controlling circuitry is also configured to cause transmission, to the one or more secondary wireless transmitters, of information indicative of the respective channel sounding resources assigned to the one or more secondary wireless transmitters.

A sixth aspect is an apparatus for a secondary wireless transmitter configured to participate in transmission to a wireless receiver using spatial multiplexing in coordination with at least a primary wireless transmitter.

The apparatus comprising controlling circuitry configured to cause reception, from the primary wireless transmitter, of information indicative of respective channel sounding resources—from a collection of available channel sounding resources—assigned to the secondary wireless transmitter, wherein each channel sounding resource assigned to the secondary wireless transmitter is assigned only to the secondary wireless transmitter, wherein each assigned respective channel sounding resource is for transmission of a respective non-spatial-multiplexed first channel sounding signal, and wherein the first channel sounding signals are for phase tracking of signals transmitted by the primary wireless transmitter and/or for phase tracking of signals transmitted by the secondary wireless transmitter.

A seventh aspect is a transmitter comprising one or more of the apparatuses according to any of the fifth or sixth aspects.

An eighth aspect is an access point comprising the transmitter of the seventh aspect and/or one or more of the apparatuses according to any of the fifth or sixth aspects.

A ninth aspect is an apparatus for a wireless receiver configured to receive spatial multiplexing transmissions from a primary wireless transmitter in coordination with one or more secondary wireless transmitters.

The apparatus comprises controlling circuitry configured to cause reception, from one or more of the primary and secondary wireless transmitters, of information indicative of respective channel sounding resources—from a collection of available channel sounding resources—assigned to the primary and secondary wireless transmitters, wherein each available channel sounding resource is assigned to at most one of the wireless transmitters, wherein each assigned respective channel sounding resource is for transmission of a respective non-spatial-multiplexed first channel sounding signal, and wherein the first channel sounding signals are for phase tracking of signals transmitted by the primary wireless transmitter and/or for phase tracking of signals transmitted by the one or more secondary wireless transmitters.

A tenth aspect is a receiver comprising one or more of the apparatuses according to the ninth aspect.

An eleventh aspect is a user station comprising the receiver of the tenth aspect and/or the apparatus according to the ninth aspect.

A twelfth aspect is an apparatus for a control node of a system comprising a primary wireless transmitter configured to participate in transmission to a wireless receiver of the system using spatial multiplexing in coordination with one or more secondary wireless transmitters of the system. The apparatus comprises controlling circuitry configured to cause assignment—from a collection of available channel sounding resources—of respective channel sounding resources to the primary wireless transmitter and to the one or more secondary wireless transmitters, wherein each available channel sounding resource is assigned to at most one of the wireless transmitters, wherein each assigned respective channel sounding resource is for transmission of a respective non-spatial-multiplexed first channel sounding signal, and wherein the first channel sounding signals are for phase tracking of signals transmitted by the primary wireless transmitter and/or for phase tracking of signals transmitted by the one or more secondary wireless transmitters.

A thirteenth aspect is a control node comprising the apparatus according to the twelfth aspect.

In some embodiments, any of the above aspects may additionally have features identical with or corresponding to any of the various features as explained above for any of the other aspects.

An advantage of some embodiments is that approaches are provided that enable estimation of the carrier frequency offset (CFO) in a distributed (or multi-point) coordinated transmission scenario. Some embodiments provide improved accuracy of the CFO estimation.

A further advantage of some embodiments is that more accurate channel estimation is enabled. This is due to that the problem of channel estimation is alleviated, since accurate CFO correction prior to channel estimation is enabled.

An advantage of some embodiments is that approaches are provided for handling of imperfections in the coordination of two or more wireless transmitters configured for distributed coordinated transmission.

Another advantage of some embodiments is that approaches are provided for estimation of imperfections in the coordination of the two or more wireless transmitters configured for distributed coordinated transmission.

Another advantage of some embodiments is that the estimated imperfections in the coordination of the two or more wireless transmitters may be more accurate than corresponding estimates achieved by other approaches.

Yet an advantage of some embodiments is that mitigation of imperfections in the coordination of the two or more wireless transmitters may be achieved and/or improved.

Yet another advantage of some embodiments is that accurate phase tracking may be achieved at the wireless receiver.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1 is a schematic block diagram illustrating example signaling according to some embodiments;

FIG. 4 is a combined flowchart and signaling diagram illustrating example method steps and signaling according to some embodiments;

FIG. 5 is a schematic block diagram illustrating an example apparatus according to some embodiments;

FIG. 6 is a schematic block diagram illustrating an example apparatus according to some embodiments;

DETAILED DESCRIPTION

Figure 1:
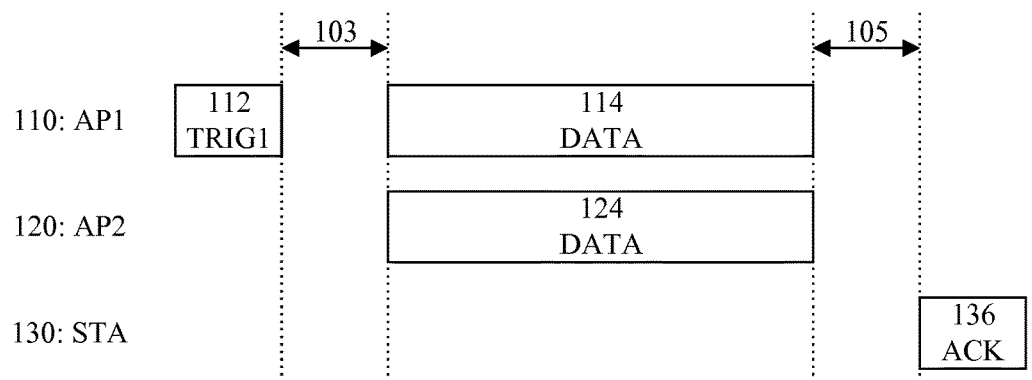

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, when two or more wireless transmitters configured for distributed (or multi-point) coordinated transmission are not sufficiently coordinated, the distributedly transmitted signals are typically not fully constructively combined at reception by the wireless receiver. Therefore, there is a need for approaches for handling of imperfections in the coordination (i.e., insufficient coordination) of the two or more wireless transmitters configured for distributed coordinated transmission.

One way to mitigate insufficient coordination of the two or more wireless transmitters is to compensate—at reception by the wireless receiver—the distributedly transmitted signals in relation to the insufficient coordination. Mitigation of insufficient coordination by the wireless receiver is particularly relevant in situations where a relatively high symbol rate and/or a relatively high order of modulation is used.

Insufficient coordination (i.e., imperfections in the coordination) may, for example, include a clock frequency difference between at least two of the wireless transmitters and/or between the wireless receiver and any of the wireless transmitters. Correspondingly, mitigation of such imperfections may, for example, include phase tracking. Phase tracking may, for example, comprise estimating one or more clock frequency differences and compensating one or more of the received signals accordingly.

The effect of such (and other) mitigation typically depends on the accuracy of estimation of the imperfections in the coordination (e.g., the accuracy of a CFO estimation). Thus, one problem with distributed coordinated transmission concepts is how estimate imperfections in the coordination of the two or more wireless transmitters.

In the following, embodiments will be described where approaches are provided for enabling accurate estimation of the carrier frequency offset in a distributed (or multi-point) coordinated transmission scenario. The approaches are suitable for handling of imperfections in the coordination of two or more wireless transmitters configured for distributed coordinated transmission. Particularly, some embodiments provide approaches for estimation of imperfections in the coordination of the two or more wireless transmitters.

Figure 2:
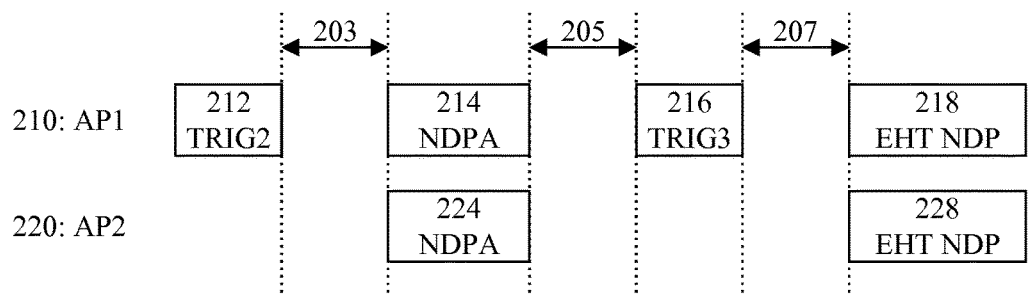
FIG. 2 is a schematic block diagram illustrating example signaling according to some embodiments.

To exemplify a context where some embodiments may be particularly applicable, reference is made to FIGS. 1 and 2, which schematically illustrate example signaling for distributed downlink multiple-input multiple-output (D-DL-MIMO) suggested for the Extremely High Throughput (EHT) concept proposed as an enhancement of the IEEE 802.11 standard (see also "Constrained Distributed MU-MIMO", by Ron Porat and Srinath Puducheri, Broadcom, doc.: IEEE 802.11-18/1439r0, September 2018).

It should be noted that very precise channel estimation (and thereby very accurate phase tracking) may be particularly important in EHT since there are discussions to support 4096-QAM (quadrature amplitude modulation). Further, it is discussed to support 16 spatial streams in EHT, in which case the channel training phase may become relatively long (e.g., up to 208 µs). Then, any uncompensated CFO may lead to severe phase errors during the channel estimation due to the length of the channel training phase. Thus, accurate phase tracking may be particularly important also for this reason.

It should also be noted, however, that embodiments may be equally applicable for any distributed wireless transmission system having several wireless transmitters and one or more associated user stations, where there is a master transmitter (primary wireless transmitter) and one or more slave transmitters (secondary wireless transmitters) associated with the master transmitter, and where the slave transmitter(s) can be triggered by the master transmitter to perform transmissions to one or more of the user stations.

The example signaling of FIG. 1 is for transmission of data packets, or data frames, (DATA) in a distributed manner, wherein the data packets from two or more wireless transmitters typically comprise the same information.

In the example of FIG. 1, two access points (AP1 and AP2) 110, 120 transmit respective space-time streams (represented in FIG. 1 by the respective data packets 114, 124) simultaneously to the same receiving station (STA) 130. Generally, one of the access points (AP1 in this case) may be a primary wireless transmitter acting as a master node, the other access points (AP2 in this case) may be secondary wireless transmitters acting as slave nodes, and the receiving station may be a wireless receiver.

The primary wireless transmitter 110 initiates the distributed coordinated transmission of the respective space-time streams by issuing a trigger signal (TRIG1) 112 for the secondary wireless transmitters 120. In some embodiments, transmission of the respective data packets 114, 124 of the space-time streams is initiated by the primary and secondary wireless transmitters a specified time duration 103 (e.g., a short interframe spacing; SIFS) after the end of the trigger signal 112.

In some embodiments, the wireless receiver 130 sends an acknowledgement signal (ACK) 136—or a non-acknowledgement signal—a specified time duration 105 (e.g., a short interframe spacing; SIFS) after the end of the transmission of the respective data packets 114, 124.

The transmission of the respective space-time streams (represented by the respective data packets 114, 124) is typically done in MIMO mode. For example, the transmission may be made using narrow beamforming towards the wireless receiver to enable spatial multiplexing.

In particular, "Constrained Distributed MU-MIMO" proposes a D-DL-MIMO scheme where the transmissions from wireless transmitters are phase aligned to create constructive interference at a wireless receiver. Such a scheme typically requires accurate frequency and phase synchronization of the wireless transmitters and accurate channel estimation at the wireless receiver. The result of the channel estimation may be fed back to the wireless transmitters in the form of Channel State Information (CSI). The procedure used for channel estimation is called channel sounding, and it may be implemented as illustrated in FIG. 2.

The example signaling of FIG. 2 is for channel estimation at a wireless receiver (e.g., a receiving station—STA—not shown) in relation to a primary wireless transmitter (e.g., an access point—AP1—210) and a secondary wireless transmitter (e.g., an access point—AP2—220). For example, AP1 and AP2 of FIG. 2 may correspond respectively to AP1 and AP2 of FIG. 1.

The primary wireless transmitter 210 initiates a channel estimation opportunity by issuing a trigger signal (TRIG2) 212 for the secondary wireless transmitters 220. The two access points (AP1 and AP2) 210, 220 transmit respective announcement packets (represented in FIG. 2 by the null data packet announcements—NDPA —214, 224) for the receiving station (STA), wherein transmission of the respective announcement packets 214, 224 is initiated by the primary and secondary wireless transmitters a specified time duration 203 (e.g., a short interframe spacing; SIFS) after the end of the trigger signal 212.

The primary wireless transmitter 210 also issues another trigger signal (TRIG3) 216 for the secondary wireless transmitters 220 a specified time duration 205 (e.g., a short interframe spacing; SIFS) after the end of the announcement packets 214, 224. The two access points (AP1 and AP2) 210, 220 transmit respective estimation packets (represented in FIG. 2 by the extremely high throughput null data packet—EHT NDP—218, 228) for the receiving station (STA), wherein transmission of the respective estimation packets 218, 228 is initiated by the primary and secondary wireless transmitters a specified time duration 207 (e.g., a short interframe spacing; SIFS) after the end of the trigger signal 216. The estimation packets 218, 228 are suitable for channel estimation by the wireless receiver. The EHT NDP may, for example, comprise several Long Training Fields (LTFs) for this purpose.

The IEEE 802.11-16 standard specifies a set of orthogonal matrices (often called P-matrices) which are employed as orthogonal cover codes—applied to the LTF—for channel estimation when utilizing more than one space-time stream (i.e., in MIMO operation). In 802.11n the orthogonal cover code is applied to all subcarriers, while in 802.11ac/ax the orthogonal cover code is not applied to the pilot subcarriers (which are used for phase tracking).

Thus, in 802.11ac/ax the pilot subcarriers are transmitted in SISO mode even in MIMO operation (i.e., the same frequency domain symbol is transmitted in all space time streams when the subcarrier is a pilot subcarrier). This allows for a wireless receiver supporting 802.11ac/ax to perform phase tracking over the LTF; even before the channel estimation is performed.

Generally, the transmission of the estimation packets 118, 128 may—at least partly—be done in single-input single-output (SISO mode), which allows for phase tracking before the channel estimation is performed. Phase tracking before channel estimation may be beneficial since a non-compensated (residual) carrier frequency offset (CFO) can lead to degraded channel estimation; while phase tracking provides for mitigation of insufficient frequency and phase synchronization (coordination) of the wireless transmitters.

For D-DL-MIMO there is a risk that insufficient coordination leads to that the clocks of the wireless transmitters (and of the wireless receiver) drift relative to each other, leading to carrier frequency offset and a phase drift of the received signals. Referring to FIG. 1, this would manifest itself in that the clocks of AP1, AP2 and STA may drift independently during the transmission of the data packet (DATA). Such a drift may occur even if the clocks of AP1 and AP2 have been synchronized earlier (e.g., using a trigger frame such as 112). Phase drift is particularly undesired when the EHT NDP is simultaneously transmitted by all APs in SISO mode.

Embodiments will be described herein where approaches are provided for handling of imperfections in the coordination of two or more wireless transmitters configured for distributed coordinated transmission. Estimation of imperfections in the coordination is enabled as well as mitigation of the imperfections in the coordination.

Figure 3:
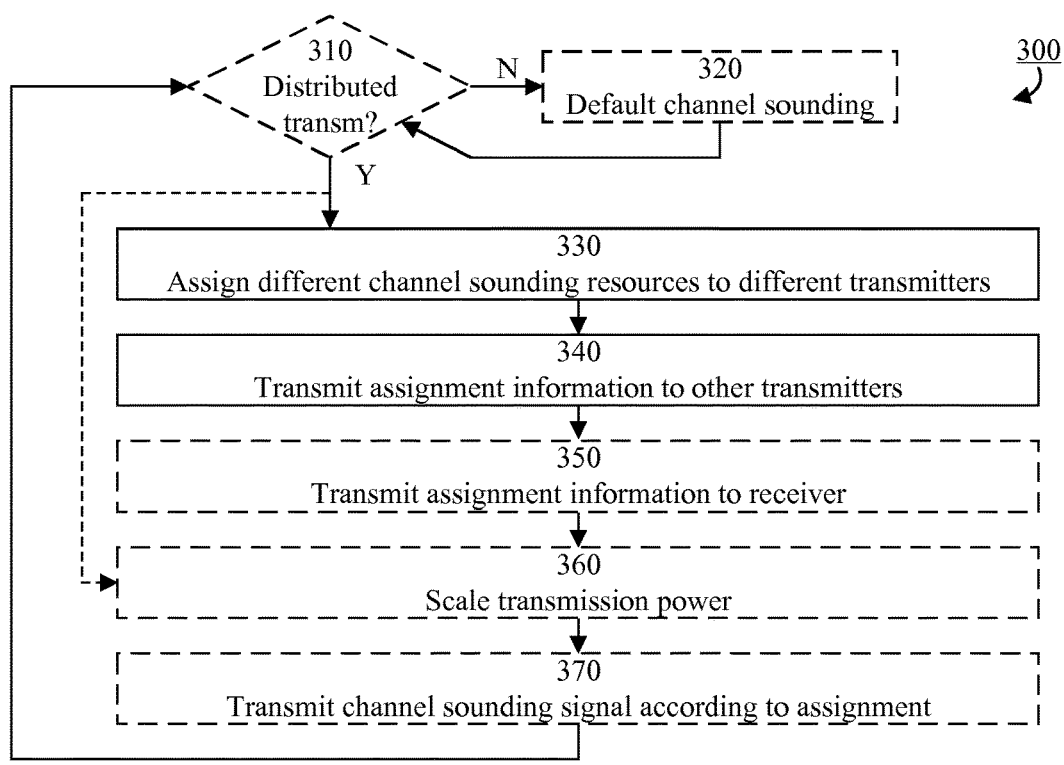
FIG. 3 is a flowchart illustrating example method steps according to some embodiments.

FIG. 3 illustrates an example method 300 for a primary wireless transmitter (compare with 110 of FIG. 1 and 210 of FIG. 2) configured to participate in transmission to a wireless receiver (compare with 130 of FIG. 1) using spatial multiplexing in coordination with one or more secondary wireless transmitters (compare with 120 of FIG. 1 and 220 of FIG. 2).

In optional step 310, it is determined whether or not distributed transmission (e.g., D-DL-MIMO) is applied. If distributed transmission is not applied (N-path out of step 310) the primary wireless transmitter uses default channel sounding as illustrated by optional step 320.

If distributed transmission is applied (Y-path out of step 310) the primary wireless transmitter assigns different channel sounding resources to different ones of the wireless transmitters (each of which acts as a primary wireless transmitter or as a secondary wireless transmitter) as illustrated in step 330, for phase tracking related to the primary and secondary wireless transmitter.

The assignment comprises assigning (from a collection of available channel sounding resources) respective channel sounding resources to the primary wireless transmitter and to the one or more secondary wireless transmitters, wherein each available channel sounding resource is assigned to at most one of the wireless transmitters.

The collection of available channel resources may, for example, comprise time and/or frequency resources of a single channel sounding opportunity. Time resources may, for example, be categorized in terms of the duration of an LTF, or similar. Frequency resources may, for example, be categorized in terms of subcarriers, or similar. A channel sounding opportunity may, for example, be defined as a transmission of an estimation packet (compare with 218 of FIG. 2).

Each assigned respective channel sounding resource is for transmission of a respective non-spatial-multiplexed first channel sounding signal (e.g., SISO mode transmission).

It should be noted that, according to some embodiments, the assignment step 330 may comprise receiving the assignment from a device not comprised in the primary wireless transmitter, e.g., a control node.

Then, assignment information is transmitted to the other wireless transmitters as illustrated in step 340. This step comprises transmitting, to the one or more secondary wireless transmitters, information indicative of the respective channel sounding resources assigned to the one or more secondary wireless transmitters.

For example, the information indicative of respective channel sounding resources assigned to the one or more secondary wireless transmitters may be transmitted to the one or more secondary wireless transmitters together with user data to be transmitted to the wireless receiver by the one or more secondary wireless transmitters (compare with the data to be comprised in the data packet 124 of FIG. 1). Alternatively or additionally, the information indicative of respective channel sounding resources assigned to the one or more secondary wireless transmitters may be transmitted to the one or more secondary wireless transmitters together with control signaling for triggering coordinated operation of the one or more secondary wireless transmitters (compare with 212 and 216 of FIG. 2).

The assignment may also be transmitted to the wireless receiver as illustrated by optional step 350. This step comprises transmitting (to the wireless receiver) the information indicative of respective channel sounding resources assigned to the one or more secondary wireless transmitters, as well as information indicative of respective channel sounding resources assigned to the primary wireless transmitter.

For example, the information indicative of respective channel sounding resources assigned to the primary and one or more secondary wireless transmitters may be transmitted to the wireless receiver together with a channel sounding announcement signal (compare with 214 of FIG. 2).

It should be noted that, even if steps 340 and 350 have been illustrated in FIG. 3 as being performed in a certain order, some embodiments feature them performed in another order or, partly or fully, in parallel.

As illustrated by optional step 370, the primary wireless transmitter may transmit channel sounding signal according to assignment. This step comprises transmitting the non-spatial-multiplexed first channel sounding signal in each respective channel sounding resource assigned to the primary wireless transmitter (compare with 218 of FIG. 2). The first channel sounding signal transmitted by the primary wireless transmitter is typically for phase tracking related to at least the primary wireless transmitter.

In some embodiments, step 370 also comprises muting available channel sounding resources not assigned to the primary wireless transmitter. The muting may be complete muting of the available channel sounding resources not assigned to the primary wireless transmitter, or may comprise muting only first channel sounding signals for the available channel sounding resources not assigned to the primary wireless transmitter.

Alternatively or additionally, step 370 may further comprise, simultaneously to transmitting the non-spatial-multiplexed first channel sounding signal in each respective channel sounding resource assigned to the primary wireless transmitter, also transmitting a spatial-multiplexed second channel sounding signal in each respective channel sounding resource assigned to the primary wireless transmitter, wherein the second channel sounding signal is for channel estimation in relation to the primary wireless transmitter. The second channel sounding signal may typically be transmitted (by the primary wireless transmitter) in each respective channel sounding resource assigned to the primary wireless transmitter as well as in each respective channel sounding resource assigned to any of the secondary wireless transmitters.

As illustrated by optional step 360, the primary wireless transmitter may scale the transmission power before transmitting the channel sounding signal. This step comprises scaling transmission power for the respective channel sounding resources assigned to the primary wireless transmitter. The scaling may be used as a power boost and is feasible when less resources are used to transmit the first channel sounding signal. The scaling may be complete scaling (e.g., for the available channel sounding resources assigned to the primary wireless transmitter), or may comprise scaling only first channel sounding signals.

The scaling factor may be larger than one and less than, or equal to, a ratio between a total amount of available channel sounding resources of the collection and an amount of respective channel sounding resources assigned to the primary wireless transmitter. Typically, the scaling factor is equal to the ratio if the available channel sounding resources not assigned to the primary wireless transmitter are muted; to achieve the same transmission power as if all available channel sounding resources were used to transmit the first channel sounding signal.

The assignment of step 330, the transmission of step 340, and (possibly) the transmission of optional step 350 may be dynamic or semi-static. In a dynamic approach, the assignment and transmission is performed repeatedly (e.g., for each channel sounding opportunity, at some regular time intervals, or event triggered). In a semi-static approach, the assignment and transmission is initially performed once (e.g., at installation of the primary wireless transmitter), and possibly updated when the system changes (e.g., at installation of a new secondary wireless transmitter).

It should be noted that the determination of whether or not distributed transmission is applied may be performed repeatedly (e.g., for each channel sounding opportunity, at some regular time intervals, or event triggered) as illustrated by the loop-backs to optional step 310 from steps 320 and 370. Repetition may apply to the entire method for the dynamic approach, or may exclude steps 330, 340 and 350 for the semi-static approach.

FIG. 4 is a combined flowchart and signaling diagram illustrating example method steps and signaling for a primary wireless transmitter 410 (AP1; compare with 110 of FIG. 1 and 210 of FIG. 2), for a secondary wireless transmitter 420 (AP2; compare with 120 of FIG. 1 and 220 of FIG. 2), and for wireless receiver 430 (STA; compare with 130 of FIG. 1).

The primary wireless transmitter 410 is configured to participate in transmission to the wireless receiver 430 using spatial multiplexing in coordination with the secondary wireless transmitter 420. Similarly, the secondary wireless transmitter 420 is configured to participate in transmission to the wireless receiver 430 using spatial multiplexing in coordination with the primary wireless transmitter 410. The wireless receiver 430 is configured to receive spatial multiplexing transmissions from the primary wireless transmitter 410 in coordination with the secondary wireless transmitter 420.

FIG. 4 illustrates operation when distributed transmission is applied. As exemplified in connection with FIG. 3, there may be a determination of whether or not distributed transmission is applied and the approach of FIG. 4 may be applied when it is determined that distributed transmission is applied (compare with Y-path out of step 310).

The primary wireless transmitter 410 assigns—from a collection of available channel sounding resources—respective channel sounding resources to the primary wireless transmitter 410 (i.e., to itself) and to the secondary wireless transmitter 420 as illustrated by step 411 (compare with step 330 of FIG. 3).

The collection of available channel resources may, for example, comprise time and/or frequency resources of a single channel sounding opportunity. Time resources may, for example, be categorized in terms of the duration of an LTF, or similar. Frequency resources may, for example, be categorized in terms of subcarriers (e.g., pilot subcarriers), or similar. A channel sounding opportunity may, for example, be defined as a transmission of an estimation packet (compare with 218 of FIG. 2).

Each available channel sounding resource is assigned to at most one (e.g., to exactly one when all available resources are used) of the wireless transmitters 410, 420. This means that any two different wireless transmitters cannot have the same assigned available channel sounding resource, and that any available channel sounding resource cannot be assigned to two or more different wireless transmitters. Thus, the assignment is done such that the channel sounding resources assigned to different wireless transmitters are orthogonal (do not overlap).

As illustrated in step 412, the primary wireless transmitter 410 transmits, to the secondary wireless transmitter 420, information 442 indicative of the respective channel sounding resources assigned to the secondary wireless transmitter (compare with step 340 of FIG. 3), and the secondary wireless transmitter 420 receives the information 442, as illustrated in step 422. The information 442 may be specific for each secondary wireless transmitter (e.g., indicative of only the channel sounding resources assigned to the receiving secondary wireless transmitter) or may be identical for all secondary wireless transmitters (e.g., indicative of the channel sounding resources assigned to each of the secondary wireless transmitters). Transmission of the information 442 enables the secondary wireless transmitter 420 to know which channel sounding resources it should use to transmit the first channel sounding signal.

The information 442 indicative of respective channel sounding resources assigned to the secondary wireless transmitter may, for example, be transmitted to the secondary wireless transmitter together with user data to be transmitted to the wireless receiver by the one or more secondary wireless transmitters (compare with the data to be comprised in the data packet 124 of FIG. 1). Alternatively or additionally, the information 442 indicative of respective channel sounding resources assigned to the secondary wireless transmitter may, for example, be transmitted to the secondary wireless transmitter together with control signaling for triggering coordinated operation of the one or more secondary wireless transmitters (compare with 212 and 216 of FIG. 2).

As illustrated in optional step 413, the primary wireless transmitter 410 may also transmit, to the wireless receiver 430, information 443 indicative of respective channel sounding resources assigned to the wireless transmitters (compare with step 350 of FIG. 3), and the wireless receiver 430 receives the information 443 as illustrated in optional step 433. The information 443 may be specific for each wireless transmitter (e.g., indicative of only the channel sounding resources assigned to the transmitting wireless transmitter) or may be identical for all wireless transmitters (e.g., indicative of the channel sounding resources assigned to each of the wireless transmitters).

Alternatively or additionally, as illustrated in optional step 423, the secondary wireless transmitter 420 may also transmit, to the wireless receiver 430, information 444 indicative of respective channel sounding resources assigned to the secondary wireless transmitter, and the wireless receiver 430 receives the information 444 as illustrated in optional step 433. The information 444 may be specific for each secondary wireless transmitter (e.g., indicative of only the channel sounding resources assigned to the transmitting secondary wireless transmitter) or may be identical for all wireless transmitters (e.g., indicative of the channel sounding resources assigned to each of the wireless transmitters).

Transmission of the information 443, 444 enables the wireless receiver 430 to know which channel sounding resources are used by which wireless transmitters 410, 420 to transmit the respective first channel sounding signal.

The information 443, 444 indicative of respective channel sounding resources assigned to the wireless transmitters may be transmitted to the wireless receiver together with a channel sounding announcement signal (compare with 214 and 224 of FIG. 2).

Steps 411, 412 and 422 may be performed dynamically or semi-statically. In a dynamic approach, the assignment 411 and transmission/reception 412, 422 are performed repeatedly (e.g., for each channel sounding opportunity, at some regular time intervals, or event triggered). In a semi-static approach, the assignment 411 and transmission/reception 412, 422 are initially performed once (e.g., at installation of the primary wireless transmitter), and possibly updated when the system changes (e.g., at installation of a new secondary wireless transmitter).

Additionally, steps 413, 423 and 433 may possibly also be performed dynamically or semi-statically. In a dynamic approach, the transmission/reception 413, 423, 433 is performed repeatedly (e.g., for each channel sounding opportunity, at some regular time intervals, or event triggered). In a semi-static approach, the transmission/reception 413, 423, 433 is initially performed once (e.g., at installation of the primary wireless transmitter), and possibly updated when the system changes (e.g., at installation of a new secondary wireless transmitter).

The dynamic approach for steps 413, 423 and 433 may be combined with either of the dynamic or semi-static approach for steps 411, 412 and 422. The semi-static approach for steps 413, 423 and 433 may be combined with the semi-static approach for steps 411, 412 and 422.

As illustrated in optional step 415, the primary wireless transmitter 410 may also transmit, to the wireless receiver 430, a non-spatial-multiplexed (e.g., SISO mode transmission, no beamforming) first channel sounding signal 445 in each respective channel sounding resource assigned to the primary wireless transmitter (compare with step 370 of FIG. 3), and the wireless receiver 430 receives the first sounding signal 445 as illustrated in optional step 435.

Correspondingly, and as illustrated in optional step 425, the secondary wireless transmitter 420 may also transmit, to the wireless receiver 430, a non-spatial-multiplexed (e.g., SISO mode transmission, no beamforming) first channel sounding signal 446 in each respective channel sounding resource assigned to the secondary wireless transmitter, and the wireless receiver 430 receives the first sounding signal 446 as illustrated in optional step 435.

Steps 415 and 435 are typically performed simultaneously. For example, performing steps 415 and 435 simultaneously may mean that EHT NDP is transmitted simultaneously from all APs.

Steps 415 and/or 435 may further comprise muting available channel sounding resources not assigned to the transmitting wireless transmitter as explained in connection with step 370 of FIG. 3. The muting may be complete muting of the available channel sounding resources not assigned to the transmitting wireless transmitter, or may comprise muting only first channel sounding signals for the available channel sounding resources not assigned to the transmitting wireless transmitter.

Furthermore, as illustrated in optional steps 414 and 424, the wireless transmitters may scale the transmission power for the respective channel sounding resources assigned to the transmitting wireless transmitter (compare with step 360 of FIG. 3). The scaling may be complete scaling (e.g., for the available channel sounding resources assigned to the transmitting wireless transmitter), or may comprise scaling only first channel sounding signals.

Thus, each assigned respective channel sounding resource is for transmission of a respective non-spatial-multiplexed first channel sounding signal, and each of the transmitted first channel sounding signals are for phase tracking related to the (primary and secondary) wireless transmitter that transmitted the first channel sounding signal.

As illustrated in optional step 435, the wireless receiver 430 receives the non-spatial-multiplexed first sounding signals 445, 446 in each indicated respective channel sounding resource.

The wireless receiver 430 estimates a carrier frequency offset (CFO) for the primary and secondary wireless transmitters based on the received first channel sounding signals 445, 446.

The estimation may comprise estimating the CFO individually for each wireless transmitter. Thus, estimating a carrier frequency offset for the primary and secondary wireless transmitters may comprise estimating a respective carrier frequency offset for each of the wireless transmitters based on corresponding ones of the received first channel sounding signals.

Alternatively or additionally, the estimation may comprise estimating a collective CFO for the wireless transmitters (e.g., an average CFO). Thus, estimating a carrier frequency offset for the primary and secondary wireless transmitters may comprise estimating an average carrier frequency offset for the primary and secondary wireless transmitters based on the received first channel sounding signals.

The estimated CFO may be used to mitigate insufficient coordination by phase tracking. For example, signals received from each wireless transmitter may be compensated (phase rotated) individually using individual CFO estimations, and/or signals received from the wireless transmitter may be collectively compensated using an average CFO estimation.

When such mitigation is performed before channel estimation, the accuracy of the channel estimates may be improved.

Simultaneously to transmitting, in steps 415 and 425, the non-spatial-multiplexed first channel sounding signal in each respective channel sounding resource assigned to the wireless transmitter, the wireless transmitters 410, 420 may also transmit a spatial-multiplexed second channel sounding signal (for channel estimation in relation to the wireless transmitter) in each respective channel sounding resource assigned to the wireless transmitter. The channel sounding resources used for the spatial-multiplexed (e.g., MIMO mode transmission, beamforming) second channel sounding signals are typically non-orthogonal (may overlap in one or more dimension). The second channel sounding signal may typically be transmitted (by each of the wireless transmitters) in each respective channel sounding resource assigned to the primary wireless transmitter as well as in each respective channel sounding resource assigned to any of the secondary wireless transmitters.

The spatial-multiplexed second channel sounding signals are received by the wireless receiver and channels in relation to the primary and secondary wireless transmitters are estimated based on the second channel sounding signals.

FIG. 5 schematically illustrates an example apparatus 510 which comprises controlling circuitry (CNTR) 500. The apparatus 510 may be comprised, or comprisable, in a transmitter and/or in an access point (e.g., any of the access points AP1 110, 210, 410 or AP2 120, 220, 420).

The controlling circuitry 500 may be configured to cause execution of one or more of the method steps as described in any of FIGS. 3 and 4. For example, the controlling circuitry 500 may be configured to execute one or more of the method steps as described in any of FIGS. 3 and 4.

The apparatus 510 may be for a primary wireless transmitter (e.g., any of the access points AP1 110, 210, 410) and/or for a secondary wireless transmitter (e.g., any of the access points AP2 120, 220, 420). In either case, the wireless transmitter is configured to participate in transmission to a wireless receiver using spatial multiplexing in coordination with one or more other wireless transmitters, wherein one wireless transmitter acts as primary wireless transmitter and the rest of the wireless transmitters act as secondary wireless transmitters.

When the apparatus 510 is for a primary wireless transmitter, the controlling circuitry 500 is configured to cause assignment—from a collection of available channel sounding resources—of respective channel sounding resources to the primary wireless transmitter and to the one or more secondary wireless transmitters, wherein each available channel sounding resource is assigned to at most one of the wireless transmitters (compare with step 330 of FIG. 3 and step 411 of FIG. 4). As previously described, each assigned respective channel sounding resource is for transmission of a respective non-spatial-multiplexed first channel sounding signal, and the first channel sounding signals are for phase tracking related to the primary and/or secondary wireless transmitters.

To this end, the controlling circuitry 500 may comprise, or be otherwise associated with (e.g., operatively connectable, or connected, to) an assigner (ASS; e.g., assigning circuitry or an assignment module) 501. The assigner 501 may be configured to assign—from the collection of available channel sounding resources—respective channel sounding resources to the primary wireless transmitter and to the one or more secondary wireless transmitters, wherein each available channel sounding resource is assigned to at most one of the wireless transmitters.

When the apparatus 510 is for a primary wireless transmitter, the controlling circuitry 500 is also configured to cause transmission, to the one or more secondary wireless transmitters, of information indicative of the respective channel sounding resources assigned to the one or more secondary wireless transmitters (compare with step 340 of FIG. 3 and step 412 of FIG. 4).

To this end, the controlling circuitry 500 may be associated with (e.g., operatively connectable, or connected, to) a transmitter (e.g., transmitting circuitry or a transmission module), illustrated in FIG. 5 in the form of a transceiver (TX/RX) 530. The transceiver 530 may be configured to transmit, to the one or more secondary wireless transmitters, the information indicative of the respective channel sounding resources assigned to the one or more secondary wireless transmitters.

When the apparatus 510 is for a secondary wireless transmitter, the controlling circuitry 500 is configured to cause reception, from the primary wireless transmitter, of information indicative of respective channel sounding resources assigned to the secondary wireless transmitter (compare with step 422 of FIG. 4).

To this end, the controlling circuitry 500 may be associated with (e.g., operatively connectable, or connected, to) a receiver (e.g., receiving circuitry or a reception module), illustrated in FIG. 5 in the form of a transceiver (TX/RX) 530. The transceiver 530 may be configured to receive, from the primary wireless transmitter, the information indicative of the respective channel sounding resources assigned to the secondary wireless transmitter.

When the apparatus 510 is for a primary or secondary wireless transmitter, the controlling circuitry 500 may be further configured to cause transmission, to the wireless receiver, of the information indicative of respective channel sounding resources assigned to the primary wireless transmitter and/or to the one or more secondary wireless transmitters (compare with step 350 of FIG. 3 and steps 413 and 423 of FIG. 4).

To this end, the controlling circuitry 500 may be associated with (e.g., operatively connectable, or connected, to) a transmitter (e.g., transmitting circuitry or a transmission module), illustrated in FIG. 5 in the form of the transceiver (TX/RX) 530. The transceiver 530 may be configured to transmit, to the wireless receiver, the information indicative of respective channel sounding resources assigned to the primary wireless transmitter and/or to the one or more secondary wireless transmitters.

When the apparatus 510 is for a primary or secondary wireless transmitter, the controlling circuitry 500 may be further configured to cause transmission of the non-spatial-multiplexed first channel sounding signal in each respective channel sounding resource assigned to the wireless transmitter (compare with step 370 of FIG. 3 and steps 415 and 425 of FIG. 4). As mentioned above, the transmission of the non-spatial-multiplexed first channel sounding signal may comprise muting of channel sounding resource not assigned to the wireless transmitter and/or scaling of the transmission power for the first channel sounding signal (compare with step 360 of FIG. 3 and steps 414 and 424 of FIG. 4).

To this end, the controlling circuitry 500 may be associated with (e.g., operatively connectable, or connected, to) a transmitter (e.g., transmitting circuitry or a transmission module), illustrated in FIG. 5 in the form of the transceiver (TX/RX) 530. The transceiver 530 may be configured to transmit the non-spatial-multiplexed first channel sounding signal in each respective channel sounding resource assigned to the wireless transmitter.

When the apparatus 510 is for a primary or secondary wireless transmitter, the controlling circuitry 500 may be further configured to cause transmission of a spatial-multiplexed second channel sounding signal in each respective channel sounding resource assigned to the wireless transmitter (simultaneously to transmission of the non-spatial-multiplexed first channel sounding signal), wherein the second channel sounding signal is for channel estimation in relation to the wireless transmitter.

FIG. 6 schematically illustrates an example apparatus 610 which comprises controlling circuitry (CNTR) 600. The apparatus 610 may be comprised, or comprisable, in a receiver and/or in a user station (e.g., any of the user stations STA 130, 430).

The controlling circuitry 600 may be configured to cause execution of one or more of the method steps as described in FIG. 4. For example, the controlling circuitry 600 may be configured to execute one or more of the method steps as described in FIG. 4.

The controlling circuitry 600 is configured to cause reception, from one or more of the primary and secondary wireless transmitters, of information indicative of respective channel sounding resources assigned to the primary and secondary wireless transmitters (compare with step 433 of FIG. 4).

To this end, the controlling circuitry 600 may be associated with (e.g., operatively connectable, or connected, to) a receiver (e.g., receiving circuitry or a reception module), illustrated in FIG. 6 in the form of a transceiver (TX/RX) 630. The transceiver 630 may be configured to receive, from the one or more of the primary and secondary wireless transmitters, the information indicative of respective channel sounding resources assigned to the primary and secondary wireless transmitters.

The controlling circuitry 600 may be further configured to cause reception of a non-spatial-multiplexed first channel sounding signal in each indicated respective channel sounding resource (compare with step 435 of FIG. 4).

To this end, the controlling circuitry 600 may be associated with (e.g., operatively connectable, or connected, to) a receiver (e.g., receiving circuitry or a reception module), illustrated in FIG. 6 in the form of a transceiver (TX/RX) 630. The transceiver 630 may be configured to receive the non-spatial-multiplexed first channel sounding signal in each indicated respective channel sounding resource.

The controlling circuitry 600 may be further configured to cause estimation of a carrier frequency offset for the primary and secondary wireless transmitters based on the received first channel sounding signals (compare with step 435 of FIG. 4).

To this end, the controlling circuitry 600 may comprise, or be otherwise associated with (e.g., operatively connectable, or connected, to), an estimator (EST; e.g., estimating circuitry or an estimation module) 601. The estimator 601 may be configured to estimate the carrier frequency offset for the primary and secondary wireless transmitters based on the received first channel sounding signals.

The controlling circuitry 600 may be further configured to cause reception of a spatial-multiplexed second channel sounding signal in each indicated respective channel sounding resource, simultaneously to reception of the non-spatial-multiplexed first channel sounding signal.

To this end, the controlling circuitry 600 may be associated with (e.g., operatively connectable, or connected, to) a receiver (e.g., receiving circuitry or a reception module), illustrated in FIG. 6 in the form of a transceiver (TX/RX) 630. The transceiver 630 may be configured to receive the spatial-multiplexed second channel sounding signal in each indicated respective channel sounding resource.

The controlling circuitry 600 may be further configured to cause estimation of channels in relation to the primary and secondary wireless transmitters based on the second channel sounding signals.

To this end, the controlling circuitry 600 may comprise, or be otherwise associated with (e.g., operatively connectable, or connected, to), an estimator (EST; e.g., estimating circuitry or an estimation module) 601. The estimator 601 may be configured to estimate the channels in relation to the primary and secondary wireless transmitters based on the second channel sounding signals.

Hence, an approach to channel sounding for D-DL-MIMO is provided according to some embodiments. The approach may enable the wireless receiver to perform phase tracking over channel sounding resources (e.g., the LTF fields) separately for each wireless transmitter. Such phase tracking may preferably be performed prior to channel estimation. This is accomplished by assigning non-overlapping channel sounding resources (e.g., pilot subcarriers) to each wireless transmitter.

Phase tracking may comprise estimating CFO for the wireless transmitters (individual CFO and/or collective—e.g., average—CFO) and compensating (e.g., phase rotating) the received signals accordingly. Accurate phase tracking is particularly important when relatively high order modulations are used, because then the demodulation process is particularly sensitive to residual CFO.

When residual CFO is properly compensated for in channel sounding signals for channel estimation (e.g., second channel sounding signals in LTFs) before the channel estimates are generated, the accuracy of the channel estimates may be improved. The channel estimates may, typically, be used to provide channel state information (CSI) to the wireless transmitters.

Some prior art approaches, e.g., following the 802.11n methodology, ignore the phase drift during channel estimation. For example, such approaches may omit pilots in the LTFs belonging to the EHT NDP. Such approaches yield unsatisfactory results, since ignoring residual CFO leads to degraded channel estimates.

An example situation will now be described to illuminate how embodiments presented herein may enable improved phase tracking by improving the accuracy of CFO estimates. The example situation is, for example, applicable when the channel sounding methodology according to IEEE 802.11ac/ax is used.

The prior art phase tracking methodology used in 802.11ac/ax implicitly assumes that there is only one clock at the transmitter (TX) side and only one clock in the receiver (RX) side and, thus, that any CFO is due to relative clock drift between the TX and RX side clocks.

However, in distributed transmission scenarios (e.g., EHT) this assumption may not be true since there could be three or more, possibly unsynchronized, clocks (one at the RX side and two or more at the TX side). As will be apparent in the following example situation, application of the prior art phase tracking methodology used in 802.11ac/ax to the scenario with three or more clocks leads to problems regarding the CFO estimation.

For illustrative purposes, it is assumed that the wireless receiver (STA) has two receive (RX) antennas, even though it may—of course—have another number of RX antennas in various implementations. It is also assumed that two wireless transmitters (AP1 and AP2) are used for D-DL-MIMO.

As mentioned before, the pilot subcarriers are transmitted in SISO mode in 802.11ac/ax also for D-DL-MIMO operation, to enable phase tracking before channel estimation. Therefore, if—contrary to what is suggested according to some embodiments presented herein—both AP1 and AP2 transmit the same pilot symbols (channel sounding signals) in the same subcarriers and in SISO mode, the signal $r_k^n(t_1)$ received at the k-th antenna of the STA, in a pilot subcarrier n at time $t_1$, can be modelled as $$r_k^n(t_1) = h_{k,1}^n e^{jt_1\theta_1} s_1 + h_{k,2}^n e^{jt_1\theta_2} s_1 + w(t_1), k=1,2,$$

where $s_1$ denotes a known pilot symbol transmitted by both AP1 and AP2, w models the noise, $h_{k,m}^n$ represents the channel corresponding to the propagation from AP m=1,2 to receive antenna k=1,2 for subcarrier n, and $\theta_1$, $\theta_2$ model the CFOs of AP1 and AP2 respectively. At a later time $t_2$, the signal $r_k^n(t_2)$ received at the k-th antenna of the STA, in a pilot subcarrier n, can be modelled as $$r_k^n(t_2) = h_{k,1}^n e^{jt_2\theta_1} s_2 + h_{k,1}^n e^{jt_2\theta_2} s_2 + w(t_2), k=1,2,$$

where it is assumed that the channel $h_{k,m}^n$ has not changed between time $t_1$ and time $t_2$. Without loss of generality it can also be assumed that $s_1 = s_2 = 1$.

Following the 802.11ac/ax methodology, the STA may attempt to estimate the phase drift (CFO) upon reception of an EHT NDP (where $s_1$, $s_2$ are transmitted in the LTFs) and prior to channel estimation, in order to compensate for the CFO before the channel estimates are generated. One way of estimating CFO is by using the statistic $z_k^n$ defined by $$z_k^n := r_k^n(t_1) r_k^n(t_2)^*, k=1,2.$$

In order to highlight the problem experienced in this situation, it is further assumed that the signal-to-noise ratio (SNR) is so high that the noise terms $w(t_1)$ and $w(t_2)$ can be ignored.

If the pilot symbols $s_1$, $s_2$ were transmitted by only one wireless transmitter (AP1), the statistic would be expressed as $$z_k^n = |h_{k,1}^n|^2 e^{j(t_1-t_2)\theta_1},$$

and the CFO represented by $\theta_1$ could be easily extracted from the phase of $z_k^n$ when the difference between time $t_1$ and time $t_2$ is known.

However, since the pilot symbols $s_1$, $s_2$ are transmitted by two wireless transmitters (AP1 and AP2), the statistic is expressed as $$z_k^n = |h_{k,1}^n|^2 e^{j(t_1-t_2)\theta_1} + |h_{k,2}^n|^2 e^{j(t_1-t_2)\theta_2} + h_{k,1}^n (h_{k,2}^n)^* e^{j(t_1\theta_1-t_2\theta_2)} + h_{k,2}^n (h_{k,1}^n)^* e^{j(t_1\theta_2-t_2\theta_1)}.$$

A severe problem with this statistic is that the phases of the terms $h_{k,1}^n (h_{k,2}^n)^*$ and $h_{k,2}^n (h_{k,1}^n)^*$ have a random nature and introduce non-negligible noise in the phase tracking. It should be noted that this problem occurs even if the received signals are essentially noiseless (i.e., noise terms $w(t_1)$ and $w(t_2)$ can be ignored). It should also be noted that this problem occurs even if the synchronization is perfect between AP1 and AP2 (i.e., $\theta_1 = \theta_2$).

Thus, having two wireless transmitters transmit the pilot symbols simultaneously using SISO leads to that the CFO cannot be accurately estimated using this approach, since the terms $h_{k,1}^n (h_{k,2}^n)^*$ and $h_{k,2}^n (h_{k,1}^n)^*$ introduce very significant estimation errors which will depend on the statistics of the channel, and which appears even at perfect synchronization and very high SNR. Thus, insufficient coordination between the AP:s and the STA cannot be accurately handled using this approach. Furthermore, there is no possibility to estimate insufficient coordination between AP1 and AP2 (i.e., $\theta_1 \neq \theta_2$) using this approach. Thus, insufficient coordination between the AP:s cannot be accurately handled using this approach.

Therefore, it is suggested according to some embodiments presented herein that there should, for SISO channel sounding, be channel sounding signals (e.g., pilot symbols) which are not transmitted in the same cannel sounding resource (e.g., subcarrier) by both AP1 and AP2.

Thus, as elaborated on earlier, it is suggested that the primary wireless transmitter assigns respective channel sounding resources to the primary wireless transmitter and to the one or more secondary wireless transmitters (wherein each available channel sounding resource is assigned to at most one of the wireless transmitters) for transmission of respective non-spatial-multiplexed first channel sounding signals for phase tracking.

Returning to the example situation described above, and adjusting it so that non-overlapping pilot subcarriers are assigned to AP1 and AP2 during the LTFs (i.e., each LTF comprised in an EHT NDP have some subcarriers designated as pilots, and different APs are assigned non-overlapping groups of pilots), it can be seen that the signal $r_k^{n_i}(t_1)$ received at the k-th antenna of the STA at time $t_1$ in subcarrier $n_L$, can be modelled as $$r_k^{n_i}(t_1) = h_{k,i}^{n_i} e^{jt\theta_i} s_i + w(t), k=1,2; i=1,2,$$

where it is assumed that $n_1 \neq n_2$ are indices for pilot subcarriers of AP1 and AP2, respectively, in the LTFs, that AP1 transmits pilots on subcarrier $n_1$ and is muted on subcarrier $n_2$, and that AP2 transmits pilots on subcarrier $n_2$ and is muted on subcarrier Then, the STA can estimate the CFO terms $\theta_i$, i=1, 2, for example using the statistics $$z_k^{n_i} := r_k^{n_i}(t_1) r_k^{n_i}(t_2)^* = |h_{k,i}^{n_i} s_i|^2 e^{j(t_1-t_2)\theta_i} + \text{noise}.$$

There are well known statistical techniques to obtain estimators $\hat{\theta}_i$ from the statistics $z_k^{n_i}$.

Figure 7:
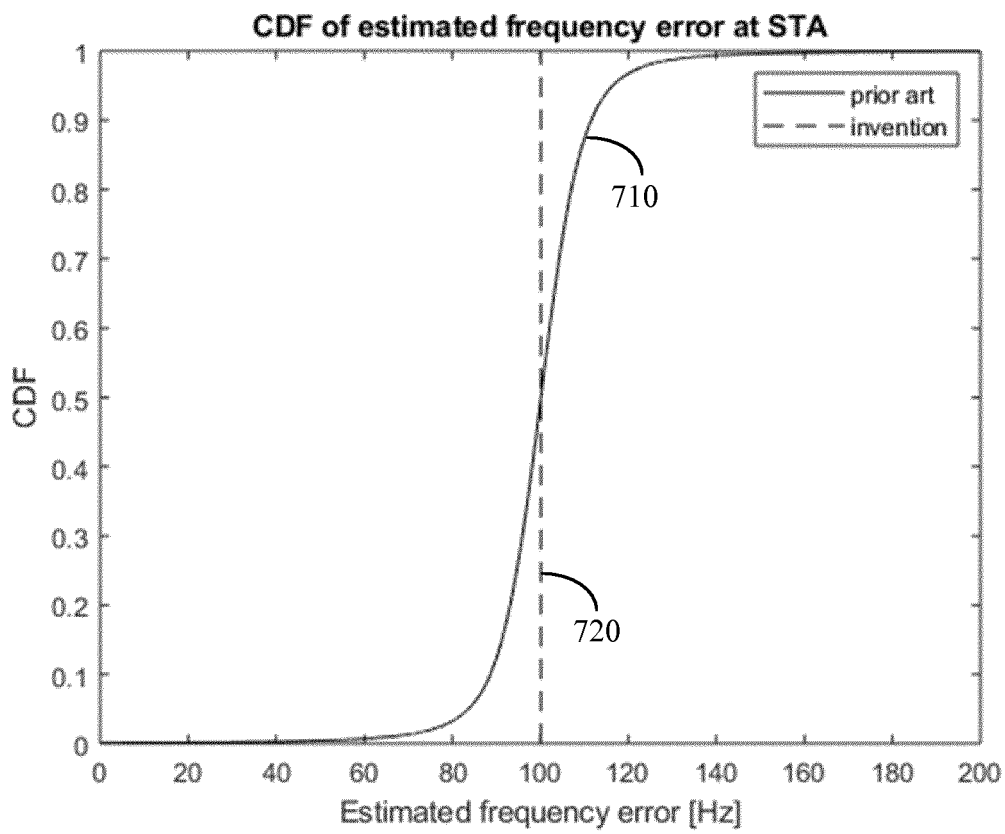
FIG. 7 is a plot illustrating example estimated frequency errors according to some embodiments.

FIG. 7 illustrates example cumulative distribution function (CDF) of estimated frequency errors at the STA for an approach according to the prior art 710 and for an approach suggested by embodiments herein 720.

The setting is similar to the example situation described above with two APs having four transmit (TX) antennas each and one STA having two RX antennas, and the channel is modeled using a Rayleigh fading model. It is assumed that there are eight pilot tones, separated by 2 MHz in frequency (similar to 802.11ax with 20 MHz channel bandwidth), and that there is no noise at the receiver (i.e., the SNR is so high that the noise can be neglected). It is also assumed that the coherence bandwidth of the channel is less than 1 MHz so that the pilot tones can be assumed to be uncorrelated.

Furthermore, it is assumed that the APs have been synchronized to an extent leaving a residual relative CFO (a frequency discrepancy) of 35 Hz between AP1 and AP2, and that the STA has performed coarse frequency correction leaving a residual CFO of 82.5 Hz with respect to AP1 and a residual CFO of 117.5 Hz with respect to AP2. Thus, a correctly estimated average CFO should be 100 Hz.

It can be seen that the prior art approach produces CFO estimates 710 with a mean value of 100 Hz, which is the accurate mean value of the actual CFOs 82.5 Hz and 117.5 Hz. However, the different CFO estimates ranges over a large amount of values even though the received signal is noiseless. In fact, the prior art approach 710 produces CFO estimates as low −2000 Hz and as high as 4000 Hz, even if this is not directly visible in FIG. 7. Since the received signal is noiseless, all the noise in the estimation originates from the terms of the form $h_{k,1}^n (h_{k,2}^n)^*$ and $h_{k,2}^n (h_{k,1}^n)^*$ which, as explained above, depend only on the channel realization and are independent of any noise. The significant fluctuation of the CFO estimates typically results in degraded, or even useless, channel estimates.

It can also be seen that the approach suggested by embodiments herein produces CFO estimates 720 which are always equal to 100 Hz, which is the accurate mean value of the actual CFOs 82.5 Hz and 117.5 Hz. There is no fluctuation of the CFO estimates, which typically results in improved channel estimation.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a user station or an access point.

Embodiments may appear within an electronic apparatus (such as a user station or an access point) comprising arrangements, circuitry, and/or logic according to any of the embodiments described herein. Alternatively or additionally, an electronic apparatus (such as a user station or an access point) may be configured to perform methods according to any of the embodiments described herein.

Figure 8:
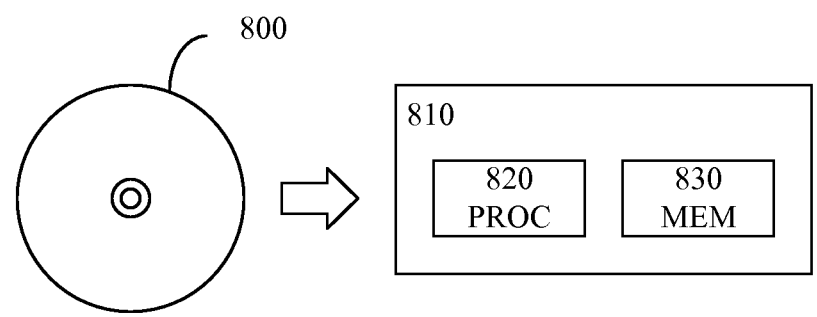
FIG. 8 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 8 illustrates an example computer readable medium in the form of a compact disc (CD) ROM 800. The computer readable medium has stored thereon a computer program comprising program instructions. The computer program is loadable into a data processor (PROC; e.g., data processing circuitry or a data processing unit) 820, which may, for example, be comprised in a user station or an access point 810. When loaded into the data processor, the computer program may be stored in a memory (MEM) 830 associated with or comprised in the data processor. According to some embodiments, the computer program may, when loaded into and run by the data processor, cause execution of method steps according to, for example, any of the methods illustrated in FIGS. 3-4 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of operating a primary wireless transmitter configured to participate in transmission to a wireless receiver using spatial multiplexing in coordination with one or more secondary wireless transmitters, the method comprising:
assigning, from a collection of available channel sounding resources, respective channel sounding resources to the primary wireless transmitter and to the one or more secondary wireless transmitters; wherein each available channel sounding resource is assigned to at most one among a set of wireless transmitters comprising the primary wireless transmitter and the one or more secondary wireless transmitters; wherein each assigned respective channel sounding resource is for transmission of a respective non-spatial-multiplexed first channel sounding signal; and wherein the first channel sounding signals are for phase tracking of signals transmitted by the primary wireless transmitter and/or for phase tracking of signals transmitted by the one or more secondary wireless transmitters; and
transmitting, to the one or more secondary wireless transmitters, information indicative of the respective channel sounding resources assigned to the one or more secondary wireless transmitters.

2. The method of claim 1, wherein the information indicative of respective channel sounding resources assigned to the one or more secondary wireless transmitters is transmitted to the one or more secondary wireless transmitters together with:
user data to be transmitted to the wireless receiver by the one or more secondary wireless transmitters; and/or
control signaling for triggering coordinated operation of the one or more secondary wireless transmitters.

3. The method of claim 1, further comprising transmitting, to the wireless receiver, the information indicative of respective channel sounding resources assigned to the one or more secondary wireless transmitters.

4. The method of claim 3, wherein the information indicative of respective channel sounding resources assigned to the one or more secondary wireless transmitters is transmitted to the wireless receiver together with a channel sounding announcement signal.

5. The method of claim 1, wherein the first channel sounding signal is for phase tracking of at least signals transmitted by the primary wireless transmitter.

6. The method of claim 1, further comprising transmitting the non-spatial-multiplexed first channel sounding signal in each respective channel sounding resource assigned to the primary wireless transmitter.

7. The method of claim 6, further comprising muting available channel sounding resources not assigned to the primary wireless transmitter.

8. The method of claim 6, further comprising scaling transmission power for the respective channel sounding resources assigned to the primary wireless transmitter; wherein the scaling factor is larger than one and less than or equal to a ratio between a total amount of available channel sounding resources of the collection and an amount of respective channel sounding resources assigned to the primary wireless transmitter.

9. The method of claim 6, further comprising, simultaneously to transmitting the non-spatial-multiplexed first channel sounding signal in each respective channel sounding resource assigned to the primary wireless transmitter, also transmitting a spatial-multiplexed second channel sounding signal in each respective channel sounding resource assigned to the primary wireless transmitter.

10. The method of claim 1, further comprising simultaneously transmitting a non-spatial-multiplexed first channel sounding signal in each indicated respective channel sounding resource assigned to the primary wireless transmitter and transmitting a spatial-multiplexed second channel sounding signal in each respective channel sounding resource assigned to the primary wireless transmitter.

11. A method of operating a secondary wireless transmitter configured to participate in transmission to a wireless receiver using spatial multiplexing in coordination with at least a primary wireless transmitter, the method comprising:
receiving, from the primary wireless transmitter, information indicative of respective channel sounding resources from a collection of available channel sounding resources, the respective channel sounding resources assigned to the secondary wireless transmitter; wherein each channel sounding resource assigned to the secondary wireless transmitter is assigned only to the secondary wireless transmitter; wherein each assigned respective channel sounding resource is for transmission of a respective non-spatial-multiplexed first channel sounding signal; wherein the first channel sounding signals are for phase tracking of signals transmitted by the primary wireless transmitter and/or for phase tracking of signals transmitted by the secondary wireless transmitter.

12. The method of claim 11, wherein the information indicative of respective channel sounding resources assigned to the secondary wireless transmitter is received together with:
user data to be transmitted to the wireless receiver by the secondary wireless transmitters; and/or
control signaling for triggering coordinated operation of the secondary wireless transmitter.

13. The method of claim 11, further comprising transmitting, to the wireless receiver, the information indicative of respective channel sounding resources assigned to the secondary wireless transmitter.

14. The method of claim 13, wherein the information indicative of respective channel sounding resources assigned to the secondary wireless transmitter is transmitted to the wireless receiver together with a channel sounding announcement signal.

15. The method of claim 11, wherein the first channel sounding signal is for phase tracking of at least signals transmitted by the secondary wireless transmitter.

16. The method of claim 11, further comprising transmitting the non-spatial-multiplexed first channel sounding signal in each respective channel sounding resource assigned to the secondary wireless transmitter.

17. A method of operating a wireless receiver configured to receive spatial multiplexing transmissions from a primary wireless transmitter in coordination with one or more secondary wireless transmitters, the method comprising:
receiving, from one or more of the primary and secondary wireless transmitters, information indicative of respective channel sounding resources from a collection of available channel sounding resources, the respective channel sounding resources assigned to the primary and secondary wireless transmitters; wherein each available channel sounding resource is assigned to at most one among a set of wireless transmitters comprising the primary wireless transmitter and the one or more secondary wireless transmitters; wherein each assigned respective channel sounding resource is for transmission of a respective non-spatial-multiplexed first channel sounding signal; wherein the first channel sounding signals are for phase tracking of signals transmitted by the primary wireless transmitter and/or for phase tracking of signals transmitted by the one or more secondary wireless transmitters.

18. The method of claim 17, wherein the information indicative of respective channel sounding resources assigned to the primary and secondary wireless transmitters is received together with a channel sounding announcement signal.

19. The method of claim 17, wherein the first channel sounding signals are for phase tracking of signals transmitted by the primary wireless transmitter and for phase tracking of signals transmitted by the one or more secondary wireless transmitters.

20. The method of claim 17, further comprising:
receiving a non-spatial-multiplexed first channel sounding signal in each indicated respective channel sounding resource; and
estimating a carrier frequency offset for the primary and secondary wireless transmitters based on the received first channel sounding signals.

21. The method of claim 20, wherein estimating a carrier frequency offset for the primary and secondary wireless transmitters comprises estimating an average carrier frequency offset for the primary and secondary wireless transmitters based on the received first channel sounding signals.

22. The method of claim 20, wherein estimating a carrier frequency offset for the primary and secondary wireless transmitters comprises estimating a respective carrier frequency offset for each of the wireless transmitters based on corresponding ones of the received first channel sounding signals.

23. The method of claim 20, further comprising, simultaneously to receiving the non-spatial-multiplexed first channel sounding signal in each indicated respective channel sounding resource, also receiving a spatial-multiplexed second channel sounding signal in each indicated respective channel sounding resource.

24. The method of claim 23, further comprising estimating channels in relation to the primary and secondary wireless transmitters based on the second channel sounding signals.

25. An apparatus for a control node of a system comprising a primary wireless transmitter configured to participate in transmission to a wireless receiver of the system using spatial multiplexing in coordination with one or more secondary wireless transmitters of the system, the apparatus comprising:
processing circuitry;
memory containing instructions executable by the processing circuitry whereby the apparatus is operative to cause:
assignment, from a collection of available channel sounding resources, respective channel sounding resources to the primary wireless transmitter and to the one or more secondary wireless transmitters; wherein each available channel sounding resource is assigned to at most one among a set of wireless transmitters comprising the primary wireless transmitter and the one or more secondary wireless transmitters; wherein each assigned respective channel sounding resource is for transmission of a respective non-spatial-multiplexed first channel sounding signal; and
wherein the first channel sounding signals are for phase tracking of signals transmitted by the primary wireless transmitter and/or for phase tracking of signals transmitted by the one or more secondary wireless transmitters.

26. A wireless communications system, comprising:
a primary wireless transmitter configured to participate in transmission to a wireless receiver using spatial multiplexing in coordination with one or more secondary wireless transmitters, the primary wireless transmitter comprising:
first processing circuitry configured to cause the primary wireless transmitter to:
assign, from a collection of available channel sounding resources, respective channel sounding resources to the primary wireless transmitter and to the one or more secondary wireless transmitters; wherein each available channel sounding resource is assigned to at most one among a set of wireless transmitters comprising the primary wireless transmitter and the one or more secondary wireless transmitters; wherein each assigned respective channel sounding resource is for transmission of a respective non-spatial-multiplexed first channel sounding signal; and wherein the first channel sounding signals are for phase tracking of signals transmitted by the primary wireless transmitter and/or for phase tracking of signals transmitted by the one or more secondary wireless transmitters; and
transmit, to the one or more secondary wireless transmitters, information indicative of the respective channel sounding resources assigned to the one or more secondary wireless transmitters;
a secondary wireless transmitter configured to participate in the transmission to the wireless receiver using spatial multiplexing in coordination with at least the primary wireless transmitter, the secondary wireless transmitter comprising:
second processing circuitry configured to cause the secondary wireless transmitter to:
receive, from the primary wireless transmitter, information indicative of the respective channel sounding resources assigned to the secondary wireless transmitter; wherein each channel sounding resource assigned to the secondary wireless transmitter is assigned only to the secondary wireless transmitter.

\* \* \* \* \*